(12) United States Patent
Miyashita et al.

(10) Patent No.: US 9,742,245 B2
(45) Date of Patent: Aug. 22, 2017

(54) GROUND WIRE CONNECTION STRUCTURE FOR MOTOR

(71) Applicant: SANYO DENKI CO., LTD., Tokyo (JP)

(72) Inventors: Toshihito Miyashita, Tokyo (JP); Manabu Horiuchi, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 253 days.

(21) Appl. No.: 14/619,359

(22) Filed: Feb. 11, 2015

(65) Prior Publication Data

US 2015/0229188 A1 Aug. 13, 2015

(30) Foreign Application Priority Data

Feb. 13, 2014 (JP) ................. 2014-025928

(51) Int. Cl.
| | |
|---|---|
| *H02K 5/22* | (2006.01) |
| *H02K 11/00* | (2016.01) |
| *H01R 4/02* | (2006.01) |
| *H01R 4/64* | (2006.01) |
| *H02K 11/40* | (2016.01) |
| *H01R 11/11* | (2006.01) |
| *H01R 13/04* | (2006.01) |

(52) U.S. Cl.
CPC ......... *H02K 11/0094* (2013.01); *H01R 4/023* (2013.01); *H01R 4/027* (2013.01); *H01R 4/64* (2013.01); *H02K 5/225* (2013.01); *H02K 11/40* (2016.01); *H01R 11/11* (2013.01); *H01R 13/04* (2013.01); *H01R 2201/10* (2013.01)

(58) Field of Classification Search
CPC ..... H02K 11/40; H02K 11/0094; H02K 5/225
See application file for complete search history.

(56) References Cited

U.S. PATENT DOCUMENTS

| | | | | |
|---|---|---|---|---|
| 4,698,534 A | * | 10/1987 | Smith .................... | A47L 9/22 310/233 |
| 4,961,018 A | * | 10/1990 | Akhter ................ | F04D 15/0218 310/71 |
| 5,313,129 A | * | 5/1994 | Stewart ................ | H02K 5/1672 310/71 |
| 5,801,465 A | * | 9/1998 | Yamada ............... | H01R 13/523 174/77 R |
| 8,141,688 B2 | * | 3/2012 | Matsushita ........... | F16D 55/226 188/158 |

FOREIGN PATENT DOCUMENTS

| | | |
|---|---|---|
| JP | 2000245094 A2 | 9/2000 |
| JP | 2004320935 A2 | 11/2004 |
| JP | 2005354795 A2 | 12/2005 |

* cited by examiner

*Primary Examiner* — Dang Le
(74) *Attorney, Agent, or Firm* — Rankin, Hill & Clark LLP

(57) ABSTRACT

A ground wire connection structure for a motor includes: a frame that has electrical conductivity; a flange that is integrated with the frame on one axial end surface of the frame and has electrical conductivity; a protrusion that is protruded outward from a flange surface of the flange and has a through hole; and a conductive pin that has a press-fit portion press-fitted and fixed into the through hole, a diameter-increased head portion, and a solder cup protruded from the head portion to allow an exposed tip end of a ground wire to be inserted and joined into the inside.

8 Claims, 3 Drawing Sheets

GROUND WIRE CONNECTION STRUCTURE FOR MOTOR

CROSS-REFERENCE TO RELATED APPLICATION

This application claims priority from Japanese Patent Application No. 2014-025928 filed with the Japan Patent Office on Feb. 13, 2014, the entire content of which is hereby incorporated by reference.

BACKGROUND

1. Technical Field

The present disclosure relates to a ground wire connection structure for a motor.

2. Description of the Related Art

High workability and reliability are required for a ground wire connection structure for a motor, in particular, a ground wire connection structure for a frame (yoke). A ground connection structure with favorable workability facilitates ground connection work. A ground connection structure with high reliability ensures ground connection. Reducing ground resistance is also important.

As a conventional ground wire connection structure for a motor, there has been disclosed a ground connecting device for a motor as described below (see JP-A-2000-245094). The ground connecting device includes a conductive bracket. A connector pin for a ground wire is press-fitted and fixed in contact with the conductive bracket. The connector pin has a conductive protrusion with a spring property.

In addition, there has been disclosed a motor that is configured to prevent idling of a frame and a stator core and has a simple grounding structure (see JP-A-2004-320935). The tip of a bolt is engaged with a recessed portion of the stator core in the motor. A lug plate is fixed with a bolt to the outer periphery of the frame.

Further, there has been disclosed a grounding structure for a motor including a grounding terminal in contact with an opening end surface of a yoke (see JP-A-2005-354795). The tip of the grounding terminal is pressed against the opening end surface.

SUMMARY

A ground wire connection structure for a motor includes: a frame that has electrical conductivity; a flange that is integrated with the frame on one axial end surface of the frame and has electrical conductivity; a protrusion that is protruded outward from a flange surface of the flange and has a through hole; and a conductive pin that has a press-fit portion press-fitted and fixed into the through hole, a diameter-increased head portion, and a solder cup protruded from the diameter-increased head portion to allow an exposed tip end of a ground wire to be inserted and joined into the inside.

DESCRIPTION OF THE EMBODIMENTS

Figure 1:
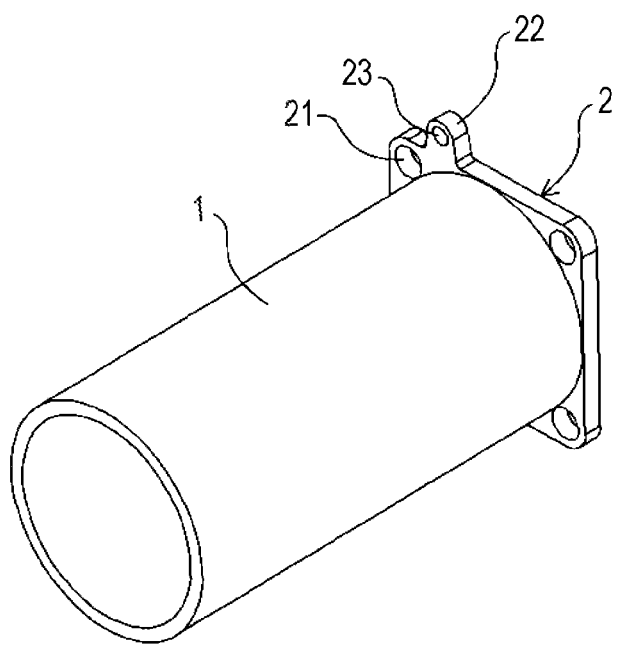
FIG. 1 is a perspective view of a flange-integrated frame according to a first embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

When a motor has a large radial dimension, a conventional ground wire connection structure can ensure workability and reliability of ground wire connection even if a ground wire connection portion and a power wire connection portion are close to each other in the motor.

However, when a motor has a small radial dimension, a ground wire connection is distanced away from a power wire connection portion to ensure the workability and reliability.

An object of the present disclosure is to provide a ground wire connection structure that ensures favorable workability of ground wire connection, high reliability of ground wire connection, and low ground resistance, even when being applied to a motor with a small radial dimension.

To attain the foregoing object, a ground wire connection structure according to the present disclosure includes a frame, a flange, a protrusion, and a conductive pin.

The frame has electrical conductivity. The flange also has electrical conductivity. The flange is integrated with one axial end surface of the frame. The protrusion is protruded outward from a flange surface of the flange. The protrusion has a through hole. The conductive pin has a press-fit portion, a diameter-increased head portion, and a solder cup protruded from the head portion.

The press-fit portion of the conductive pin is press-fitted and fixed into the through hole of the protrusion. An exposed tip portion of the ground wire is inserted into the solder cup of the conductive pin. The inserted exposed tip portion is jointed to the solder cup.

With the ground wire connection structure according to embodiments of the present disclosure, the press-fit portion of the conductive pin is press-fitted and fixed into the through hole formed in the protrusion of the flange. In addition, the exposed tip portion of the ground wire is inserted and joined into the solder cup of the conductive pin. Therefore, the ground wire connection structure according to the embodiments of the present disclosure ensures favorable workability of ground wire connection.

In addition, the exposed tip portion of the ground wire is inserted and joined into the solder cup. This ensures high reliability of ground wire connection.

Further, the flame, the flange, and the conductive pin all have electrical conductivity. Thus, a ground wire connection structure with low ground resistance can be provided.

Ground wire connection structures according to first and second embodiments will be described with reference to the accompanying drawings.

Each of the ground wire connection structures according to the first and second embodiments includes a conductive pin having a press-fit portion press-fitted and fixed into a through hole in a protrusion of a flange, and an exposed tip portion of a ground wire inserted and joined into a solder cup of the conductive pin. Therefore, according to the first and second embodiments, it is possible to ensure favorable workability of ground wire connection and high reliability of ground wire connection. It is also possible to provide a ground wire connection structure with low ground resistance.

First Embodiment

[Configuration of Ground Wire Connection Structure]

Figure 2:
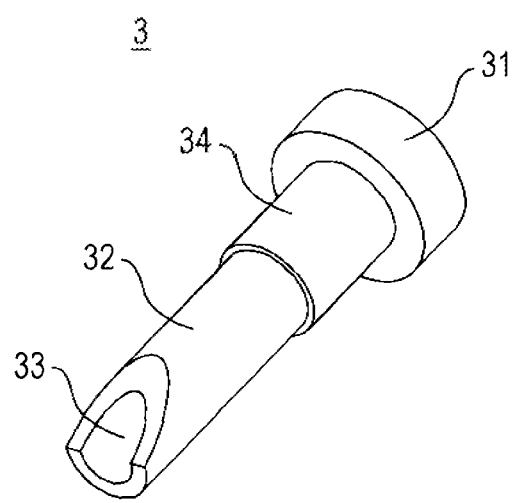
FIG. 2 is a perspective view of a conductive pin according to the first embodiment.
Figure 3:
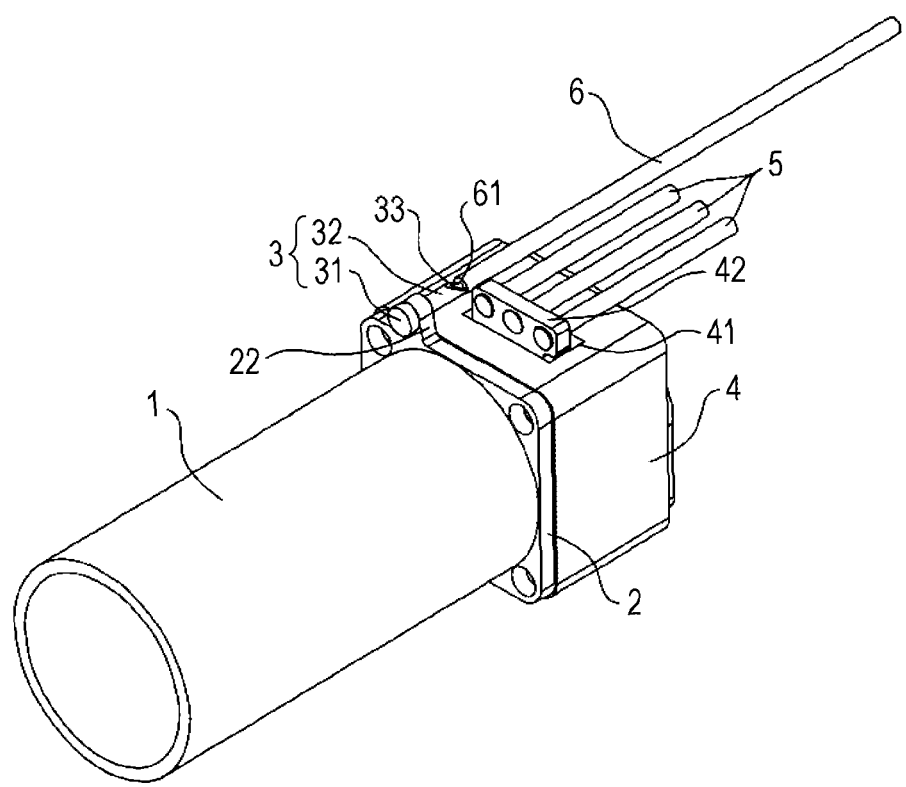
FIG. 3 is a perspective view of connection status of a ground wire connection structure according to the first embodiment.

First, referring to FIGS. 1 to 3, a configuration of the ground wire connection structure according to the first embodiment will be described. FIG. 1 is a perspective view of a flange-integrated frame according to the first embodiment. FIG. 2 is a perspective view of a conductive pin according to the first embodiment. FIG. 3 is a perspective view of connection status of the ground wire connection structure according to the first embodiment.

The ground wire connection structure of the first embodiment is particularly suited to a motor with a small radial dimension. The motor includes a stator and a rotor in a frame.

As illustrated in FIG. 1, the frame 1 is a cylindrical metallic member. In the frame 1, a circular columnar space is defined to accommodate the stator and the rotor.

The frame 1 serves as a yoke. Therefore, the frame 1 has the function of closing a magnetic line of force and maximizing the action of electromagnetic induction. The frame 1 also has the function of suppressing the impact on peripheral devices of the motor by a magnetic field resulting from electromagnetic induction.

An almost rectangular flange 2 is integrated with one axial end surface of the frame 1. The flange 2 extends radially outward from an outer periphery of the frame 1.

The frame 1 and the flange 2 are firmed from conductive materials. The materials for the frame 1 and the flange 2 may include a soft magnetic body such as a silicon steel plate, aluminum, and an aluminum alloy, for example. However, the materials are not limited thereto.

The flange 2 has attachment holes 21 at four corners. The flange 2 also has a protrusion 22 protruded outward by extending part of a flange surface. In the embodiment, the protrusion 22 is formed on the top of the flange 2. The protrusion 22 has a through hole 23 for press-fitting of a conductive pin 3 (see FIG. 2).

As illustrated in FIG. 2, the conductive pin 3 has a disc-shaped head portion 31 with an enlarged diameter. A solder cup 32 protruded from the head portion in the axial direction of the conductive pin 3 is formed on one plane of the head portion 31.

The solder cup 32 is a cylindrical member. The solder cup 32 has an obliquely chamfered opening 33 at the tip. An exposed tip portion 61 of a ground wire 6 is inserted into the opening 33 of the solder cup 32 (see FIG. 3).

The solder cup 32 of the conductive pin 3 has a press-fit portion 34 at the base end portion. The press-fit portion 34 is press-fitted and fixed into the through hole 23 in the protrusion 22 of the flange 2. Accordingly, the conductive pin 3 is fixed to the flange 2 via the protrusion 22.

Therefore, the outer diameter of the press-fit portion 34 is larger than the outer diameter of the solder cup 32. In addition, the outer diameter of the press-fit portion 34 is slightly larger than the inner diameter of the through hole 23 in the protrusion 22 of the flange 2.

The possible materials for the conductive pin 3 may include conductive materials such as aluminum and copper, for example. However, the materials are not limited thereto.

As illustrated in FIG. 3, the frame 1 is attached on the flange 2 side to a bracket 4. The bracket 4 has an opening 41 in one section wall (top section wall in the embodiment). A power line connector 42 is protruded from the opening 41. A three-phase AC power line 5 is connected to the power line connector 42, for example.

The protrusion 22 of the flange 2 is protruded outward beyond the section wall of the bracket 4. The conductive pin 3 is inserted into the through hole 23 of the protrusion 22 from the frame 1 side. The solder cup 32 of the conductive pin 3 has the diameter-increased press-fit portion 34 at the base end portion. The conductive pin 3 is press-fitted and fixed into the through hole 23 of the protrusion 22 via the press-fit portion 34. At this time, the conductive pin 3 is press-fitted and fixed such that the chamfered opening 33 of the solder cup 32 faces upward.

When the conductive pin 3 is press-fitted and fixed into the through hole 23 of the protrusion 22, the solder cup 32 of the conductive pin 3 is exposed to the bracket 4 side. The chamfered opening 33 of the solder cup 12 faces upward. The exposed tip portion 61 of the ground wire 6 is inserted into the opening 33 of the solder cup 32. Then, the exposed tip portion 61 of the ground wire 6 is joined to the solder cup 32 by soldering or the like. Accordingly, the ground wire 6 is electrically connected.

[Operations of Ground Wire Connection Structure]

Next, referring to FIGS. 1 to 3, operations of the ground wire connection structure of the first embodiment will be described.

The ground wire connection structure of the embodiment has the protruded press-fit portion 34 at the base end portion of the solder cup 32 protruded from the diameter-increased head portion 31 of the conductive pin 3. That is, in the conductive pin 3, the solder cup 32 and the press-fit portion 34 exist on the one plane side of the head portion 31. The opening 33 of the solder cup 32 is obliquely chamfered.

The press-fit portion 34 of the conductive pin 3 is inserted into the through hole 23 in the protrusion 22 of the flange 2 from the frame 1 side. The outer diameter at the press-fit portion 34 is slightly larger than the inner diameter of the through hole 23 in the protrusion 22. Therefore, the press-fit portion 34 is reliably press-fitted and fixed into the through hole 23 of the protrusion 22.

When the press-fit portion 34 of the conductive pin 3 is press-fitted and fixed into the through hole 23 of the protrusion 22 from the frame 1 side, the solder cup 32 is exposed to the bracket 4 side.

The chamfered opening 33 of the solder cup 32 faces upward. The exposed tip portion 61 of the ground wire 6 is inserted into the opening 33 of the solder cup 32. Then, the exposed tip portion 61 of the ground wire 6 is joined to the solder cup 32 by soldering or the like. Accordingly, the ground wire 6 is electrically connected.

According to the ground wire connection structure of the embodiment, the press-fit portion 34 of the conductive pin 3 is press-fitted and fixed into the through hole 23 in the protrusion 22 of the flange 2. Then, the exposed tip portion 61 at the ground wire 6 is inserted and soldered into the opening 33 of the solder cup 32 in the conductive pin 3. Therefore, the ground wire connection structure of the first embodiment provides favorable workability of ground wire connection.

In addition, the exposed tip portion 61 of the ground wire 6 is inserted and soldered into the opening 33 of the solder cup 32. Thus, reliability of ground wire connection can be ensured.

Further, the frame 1, the flange 2, and the conductive pin 3 all have favorable electrical conductivity. Accordingly, the ground wire connection structure with low ground resistance can be provided.

Second Embodiment

Figure 4:
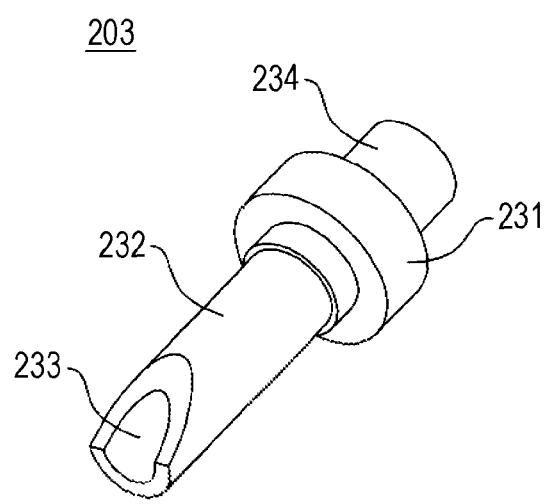
FIG. 4 is a perspective view of as conductive pin according to a second embodiment.
Figure 5:
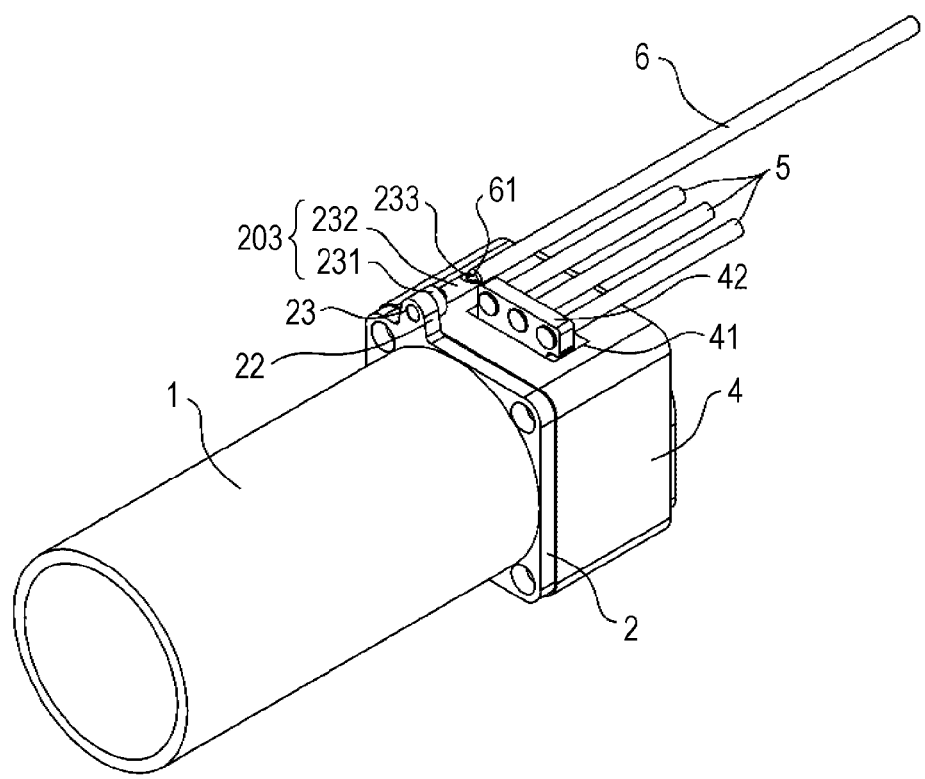
FIG. 5 is a perspective view of connection status of a ground wire connection structure according to the second embodiment.

Next, referring to FIGS. 4 and 5, the ground wire connection structure of the second embodiment will be described. FIG. 4 is a perspective view of a conductive pin according to the second embodiment. FIG. 5 is to perspective view of connection status of the ground wire connection structure according to the first embodiment. In FIGS. 4 and 5, the same structural elements as those in the first embodiment are given the same reference numerals as those in the first embodiment.

The ground wire connection structure of the second embodiment is configured in the same manner as the first embodiment, except that the structure of a conductive pin 203 is differently structured.

The conductive pin 203 of the second embodiment has a protruded press-fit portion 234 at a disc-shaped head portion 231 on the side opposite to a solder cup 232. That is, the solder cup 232 exists on one plane side of the head portion 231 in the conductive pin 203, and the press-fit portion 234 exists on the other plane side of the head portion 231 in the conductive pin 203.

An opening 233 of the solder cup 232 is obliquely chamfered as that in the first embodiment.

The press-fit portion 234 of the conductive pin 203 is inserted into the through hole 23 of the protrusion 22 in the flange 2 from the side opposite to the frame 1 (from the bracket 4 side). The outer diameter of the press-fit portion 234 is slightly larger than the inner diameter of the through hole 23 in the protrusion 22. Therefore, the press-fit portion 234 is reliably press-fitted and fixed into the through hole 23 of the protrusion 22.

The diameter of the head portion 231 of the conductive pin 203 is larger than the diameter of the press-fit portion 234 and the diameter of the solder cup 232. The solder cup 232 is formed at the head portion 231 on the side opposite to the press-fit portion 234. That is, when the press-fit portion 234 of the conductive pin 203 is press-fitted and fixed into the through hole 23 of the protrusion 22 from the bracket 4 side, the solder cup 232 is exposed to the bracket 4 side.

The chamfered opening 233 of the solder cup 3 faces upward. The exposed tip portion 61 of the ground wire 6 is inserted into the opening 233 of the solder cup 232. Then, the exposed tip portion 61 of the ground wire 6 is jointed to the solder cup 232 by soldering or the like. Accordingly, the ground wire 6 is electrically connected.

The ground wire connection structure of the second embodiment basically provides the same operations and advantages as those in the ground wire connection structure of the second embodiment. In particular, according to the ground wire connection structure of the second embodiment, the conductive pin 203 has the press-fit portion 234 at the head portion 231 on the side opposite to the solder cup 232. In addition, the press-fit portion 234 of the conductive pin 203 is press-fitted into the through hole 23 of the protrusion 22 in the lane 2 from the side opposite to the frame 1 (from the bracket 4 side). Therefore, the ground wire connection structure in the second embodiment provides an advantageous effect that all the connection work of the ground wire 6 can be performed at the bracket 4 side.

The foregoing preferred embodiments of the present disclosure are merely examples for description of the embodiments of the present disclosure. The description of the preferred embodiments is not intended to limit the scope of the present disclosure to these embodiments. The present disclosure can be embodied in various modes different from the foregoing embodiments without deviating from the gist of the present disclosure.

In addition, ground wire connection structures according to embodiments of the present disclosure may be first to third ground wire connection structures as described below.

The first ground wire connection structure is a ground wire connection structure for a motor including: a frame that has electrical conductivity; a flange that is integrated with one axial end surface of the frame and has electrical conductivity; a protrusion that is formed to protrude outward from a flange surface of the flange; a through hole that is formed in the protrusion of the flange; and a conductive pin that has a solder cup protruded from a diameter-increased head portion, wherein the conductive pin is partly press-fitted and fixed into the through hole of the protrusion, and an exposed tip portion of as ground wire is inserted and joined into the solder cup of the conductive pin.

The second ground wire connection structure is configured such that, in the first ground wire connection structure, the conductive pin has the press-fit portion at a base end portion of the solder cup, and the press-fit portion of the conductive pin is press-fitted and fixed into the through hole of the protrusion from the frame side.

The third ground wire connection structure is configured such that, in the first ground wire connection structure, the conductive pin has the press-fit portion via the head portion on the side opposite to the solder cup, and the press-fit portion of the conductive pin is press-fitted into the through hole of the protrusion from the side opposite to the frame.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A ground wire connection structure for a motor, comprising:
   a frame that has electrical conductivity;
   a flange that is integrated with the frame on one axial end surface of the frame and has electrical conductivity;
   a plurality of attachment holes on a flange surface of the flange;
   a protrusion on the flange surface, the protrusion being protruded radially outward beyond the plurality of attachment holes and having a through hole; and
   a conductive pin that has a press-fit portion press-fitted and fixed into the through hole, a diameter-increased head portion, and a solder cup protruded from the diameter-increased head portion to allow an exposed tip end of a ground wire to be inserted and joined into an inside.

2. The ground wire connection structure for the motor according to claim 1, further comprising a conductive pin that has the press-fit portion formed at a base end portion of the solder cup and press-fitted into the through hole from a side of the frame.

3. The ground wire connection structure for the motor according to claim 1, further comprising a conductive pin that has the press-fit portion formed at the head portion on a side opposed to the solder cup and press-fitted into the through hole from a side opposite to the frame.

4. The ground wire connection structure for the motor according to claim 1, further comprising a bracket on which the flange is attached, wherein
the protrusion is protruded radially outward beyond the bracket.

5. The ground wire connection structure for the motor according to claim 1, wherein a tip of the solder cup is obliquely chamfered.

6. The ground wire connection structure for the motor according to claim 1, wherein the diameter-increased head portion has a disc-shape.

7. The ground wire connection structure for the motor according to claim 1, wherein an outer diameter of the press-fit portion is larger than an outer diameter of the solder cup.

8. The ground wire connection structure for the motor according to claim 1, wherein the diameter-increased head portion is continuously provided to the press-fit portion, and an outer diameter of the diameter-increased head portion is larger than an outer diameter of the press-fit portion.

\* \* \* \* \*